United States Patent
Yasutomi

(10) Patent No.: US 9,200,558 B2
(45) Date of Patent: Dec. 1, 2015

(54) MUFFLER AND ENGINE-DRIVEN WORK MACHINE

(75) Inventor: Toshinori Yasutomi, Ibaraki (JP)

(73) Assignee: HITACHI KOKI CO., LTD., Tokyo (JP)

( * ) Notice: Subject to any disclaimer, the term of this patent is extended or adjusted under 35 U.S.C. 154(b) by 63 days.

(21) Appl. No.: 14/004,306

(22) PCT Filed: Mar. 14, 2012

(86) PCT No.: PCT/JP2012/057255
§ 371 (c)(1),
(2), (4) Date: Sep. 10, 2013

(87) PCT Pub. No.: WO2012/133071
PCT Pub. Date: Oct. 4, 2012

(65) Prior Publication Data
US 2014/0000574 A1    Jan. 2, 2014

(30) Foreign Application Priority Data

Mar. 25, 2011    (JP) .................................. 2011-067535

(51) Int. Cl.
*F01N 13/10*    (2010.01)
*F02B 63/02*    (2006.01)
(Continued)

(52) U.S. Cl.
CPC  *F01N 13/00* (2013.01); *F01N 1/08* (2013.01); *F01N 13/002* (2013.01); *F01N 13/08* (2013.01);
(Continued)

(58) Field of Classification Search
CPC ........... F02B 63/02; F01N 1/02; F01N 1/026; F01N 13/105; F01N 13/10

USPC ......................... 181/240, 231, 249, 255, 250; 173/DIG. 2; 123/65 R, 65 EM, 65 PD
See application file for complete search history.

(56) References Cited

U.S. PATENT DOCUMENTS 3,665,712 A  *  5/1972 Tenney ........................... 60/314
3,842,599 A  *  10/1974 Ehlen ............................. 60/273
(Continued)

FOREIGN PATENT DOCUMENTS

DE    26 43 242 A1    3/1978
JP    51-67934 U    5/1976
(Continued)

OTHER PUBLICATIONS

International Search Report and Written Opinion of the International Search Report for PCT/JP2012/057255 dated Jul. 20, 2012.
(Continued)

*Primary Examiner* — Edgardo San Martin
(74) *Attorney, Agent, or Firm* — Kenealy Vaidya LLP

(57) ABSTRACT

An engine-driven work machine including: a two-cycle engine including a piston which is configured to reciprocally move inside a cylinder to which an exhaust port is formed; and a front end tool configured to be driven by the engine, wherein an expansion chamber is connected to the exhaust port via a connection duct, wherein the connection duct includes a first end and a second end, and the connection duct extends from the first end in an axial direction of the exhaust port, is bent in a direction away from an axis of the exhaust port and is connected to the expansion chamber at the second end, and wherein a housing of the expansion chamber is disposed at an inner side of the connection duct and an engine block including the cylinder and a crank case.

19 Claims, 11 Drawing Sheets

(51) Int. Cl.
*F01N 13/08* (2010.01)
*F01N 13/00* (2010.01)
*F01N 1/08* (2006.01)
*F01N 13/18* (2010.01)
*F02B 27/04* (2006.01)
*F02B 63/00* (2006.01)
*F02B 75/02* (2006.01)

(52) U.S. Cl.
CPC .......... *F01N 13/1888* (2013.01); *F02B 27/04* (2013.01); *F01N 2470/00* (2013.01); *F01N 2470/20* (2013.01); *F01N 2590/06* (2013.01); *F02B 63/02* (2013.01); *F02B 2075/025* (2013.01); *Y02T 10/146* (2013.01)

(56) References Cited

U.S. PATENT DOCUMENTS

| | | | | |
|---|---|---|---|---|
| 4,290,501 | A * | 9/1981 | Tanaka | 181/228 |
| 4,570,439 | A | 2/1986 | Uchinishi | |
| 5,109,949 | A * | 5/1992 | Sato et al. | 181/240 |
| 5,293,744 | A * | 3/1994 | Imagawa et al. | 60/302 |
| 5,959,262 | A * | 9/1999 | Menzel | 181/231 |
| 5,996,732 | A * | 12/1999 | Burger et al. | 181/230 |
| 6,152,092 | A * | 11/2000 | Andreasson et al. | 123/65 R |
| 6,698,194 | B2 * | 3/2004 | Blair et al. | 60/314 |
| 6,959,782 | B2 * | 11/2005 | Brower et al. | 181/272 |
| 7,032,709 | B2 * | 4/2006 | Hoche et al. | 181/268 |
| 7,380,637 | B2 * | 6/2008 | Sieben et al. | 181/240 |
| 7,775,323 | B2 * | 8/2010 | Schweinberger | 181/282 |
| 2003/0173148 | A1 * | 9/2003 | Andersson et al. | 181/272 |
| 2007/0199554 | A1 * | 8/2007 | Jakobsson et al. | 125/13.01 |
| 2008/0164092 | A1 * | 7/2008 | Schweinberger | 181/282 |
| 2010/0083512 | A1 * | 4/2010 | Shimokawa et al. | 30/381 |

FOREIGN PATENT DOCUMENTS

| | | | |
|---|---|---|---|
| JP | 1-92515 | A | 4/1989 |
| JP | 2012067668 | A * | 4/2012 |
| JP | 2012067669 | A * | 4/2012 |
| WO | WO 2012120118 | A1 * | 9/2012 |
| WO | WO 2014155945 | * | 2/2014 |

OTHER PUBLICATIONS

Japanese Office Action for the related Japanese Patent Application No. 2011-067535 dated Dec. 25, 2014.

Chinese Office Action for the related Chinese Patent Application No. 2012800151373 dated Jun. 17, 2015.

* cited by examiner

MUFFLER AND ENGINE-DRIVEN WORK MACHINE

This application is a U.S. national phase filing under 35 U.S.C. §371 of PCT Application No. PCT/JP2012/057255, filed Mar. 14, 2012, and which in turn claims priority under 35 U.S.C. §119 to Japanese Patent Application No. JP2011-067535 filed Mar. 25, 2011, the entireties of which are incorporated by reference herein.

TECHNICAL FIELD

Aspects of the present invention relate to an engine-driven work machine such as a brush cutter, a chain saw, a blower or the like, and specifically, to a compact muffler with reduced exhaust gas and improved power characteristics, and an engine-driven work machine including the same.

BACKGROUND ART

A two-cycle engine is in a wide use for portable engine-driven work machines for which compactness, lightness and high power are required. High power and fuel-efficiency are required for the two-cycle engine. However, a problem of low power and increased exhaust gas occurs to the two-cycle engine when fresh gas escapes through an exhaust hole during exhaust and scavenge. In order to avoid this problem, there has been proposed a system in which the number or shape of scavenge hole or exhaust hole is devised, or a layered scavenging system in which air is guided first.

SUMMARY OF INVENTION

Technical Problem

For example, a muffler disclosed in JP-A-H01-92515 is configured to prevent fresh gas from escaping by using a pressure pulsation effect. However, since an expansion chamber and an exhaust pipe, which are continuous to an exhaust port of the muffler, are installed separately, it is difficult to make a compact muffler. As a result, it is difficult to apply the muffler to portable work machines. Specifically, in an engine cutter that cuts a concrete or the like, since a wheel guard and an arm that holds a power transmission for rotating a blade are formed around the muffler, height, width and length of the expansion chamber are limited. Therefore, it becomes difficult to secure sufficient length of the exhaust pipe, and it becomes difficult to achieve reduced exhaust gas and high power by the pressure pulsation.

Aspects of the present invention have been conceived in view of the above-described problems, and an object thereof is to provide a compact muffler, in which a pressure pulsation effect is not destroyed, and an engine-driven work machine including the muffler.

Another object of the aspects of the present invention is to provide a compact muffler with improvement in disposing a connection duct that connects an exhaust port of an engine and an opening of the muffler and an engine-driven work machine including the muffler.

Another object of the aspects of the present invention is to provide an engine-driven work machine including a muffler which is disposed in a space between a front end tool and an engine without widening a distance between the operating center of the front end tool and the engine.

Solution to Problem

Advantageous Effects of Invention

Representative aspects of the present invention disclosed in the present specification are as follows.

According to an aspect of the present invention, there is provided an engine-driven work machine including: a two-cycle engine including a piston which is configured to reciprocally move inside a cylinder to which an exhaust port is formed; and a front end tool configured to be driven by the engine, wherein an expansion chamber is connected to the exhaust port via a connection duct, wherein the connection duct includes a first end and a second end, and the connection duct extends from the first end in an axial direction of the exhaust port, is bent in a direction away from an axis of the exhaust port and is connected to the expansion chamber at the second end, and wherein a housing of the expansion chamber is disposed at an inner side of the connection duct and an engine block including the cylinder and a crank case.

Accordingly, since the connection duct extends from the first end in the axial direction of the exhaust port, is bent in a direction away from the axis of the exhaust port and is connected to the expansion chamber at the second end, and the housing of the expansion chamber is arranged at an inner side of the engine block and the connection duct, it is possible to secure sufficient length of the connection duct tunable with a normal rotational speed of 8,000 rpm to 9,000 rpm in a space with limited height, width and length such as a space between a rotation part of an engine cutter and the engine. In addition, since the connection duct is curved toward a crank case and below the cylinder axis so that exhaust gas that emerges from the exhaust port flows toward the crank case, it is possible to make a significantly compact muffler.

The connection duct may have a U-shape in which the second end connected to the expansion chamber faces the crank case of the engine.

Accordingly, since the connection duct has a U-shape in which the second end connected to the expansion chamber faces the crank case of the engine, it is possible to secure sufficient length of the connection duct with a simple structure.

The connection duct may include a branching portion, and a U-shaped branch pipe having a closed end may be connected to the branching portion.

Accordingly, since a U-shaped branch pipe having a closed end is connected to the connection duct, it is possible to reliably achieve an exhaust pressure pulsation effect. In addition, since the expansion chamber can be applied to a number of tuning revolution of pulsation or different engine displacements only by changing length or sectional area of the connection duct and the branch pipe, it is possible to promote common use of the expansion chamber.

A first flange and a second flange may be fixed to both ends of the connection duct, respectively, and the first flange may be joined to the exhaust port and the second flange may be joined to the expansion chamber.

Accordingly, since first and second flanges are fixed to both ends of the connection duct, the first flange is joined to the exhaust port and the second flange is joined to the expansion chamber, it is possible to strongly fix the expansion chamber to the engine using the screws or bolts for joining the connection duct to the exhaust port of the cylinder.

The expansion chamber may have a wall having a shape following an inner circumference side shape of the connection duct, and a radius of curvature R1 of an upper side of the connection duct may be larger than a radius of curvature R2 of a lower side of the connection duct.

Accordingly, since the expansion chamber has a wall having a shape following an inner circumference of the connection duct, it is possible to secure a sufficient volume of the expansion chamber. In addition, since the connection duct is installed to extend in an extension line direction of the axis of the exhaust port and a radius of curvature R1 of an upper side of the connection duct is larger than a radius of curvature R2 of a lower side of the connection duct, a rapid bending can be avoided and accordingly exhaust resistance can be reduced. In addition, energy of pressure pulsation of the connection duct can be prevented from being decreased.

A plate member extending outward may be formed at an outer edge of the expansion chamber, and the expansion chamber may be fixed to the engine by inserting the plate member between the cylinder and the first flange.

Accordingly, since the expansion chamber is fixed to the engine by forming a plate member extending outside at an outer edge of the expansion chamber and inserting the plate member between the cylinder and the first flange, the connection duct and the expansion chamber can be fixed by common screws or bolts.

The plate member may include a second screw part which is for fixing the plate member to the second flange and a third screw hole which is for fixing the plate member to the engine and which is formed in the vicinity of the second screw part.

Accordingly, since the plate member includes a second screw part to be fixed to the second flange, exhaust gas can be effectively prevented from being leaked around an inlet opening of the expansion chamber. In addition, since the expansion chamber can be reliably fixed to the engine by screws or bolts other than the connection duct, the expansion chamber can be effectively prevented from being loosened due to vibration of the engine.

The connection duct may be configured by two members separated at a cross-section surface parallel to a longitudinal direction thereof, each member being formed by joining a metal press member.

Accordingly, since the connection duct is configured by two members separated at a cross-section surface parallel to a longitudinal direction thereof, and each member is formed by joining a metal press member, the connection duct can be formed inexpensively.

An exhaust hole may be formed at a lateral side of the expansion chamber and an exhaust outlet that discharges the exhaust gas to the front-lower side of the engine may be formed to the exhaust hole.

Accordingly, since an exhaust hole is formed at the lateral side of the expansion chamber and an exhaust outlet that discharges exhaust gas to the front-lower side of the engine is formed to the exhaust hole, an operator can be prevented from contacting exhaust gas.

According to another aspect of the present invention, there is provided a muffler including: an expansion chamber fixed to a cylinder and a crank case of a two-cycle engine; and a connection duct connecting an exhaust port of the engine to an opening of the expansion chamber and has a bent shape when viewed from the lateral side, wherein the expansion chamber is disposed at an inner side of the bent connection duct and has a shape following a shape of the connection duct adjacent to the expansion chamber.

Accordingly, since the connection duct has a bent shape and the expansion chamber is disposed at an inner side of the bent connection duct and has a shape following a shape of the connection duct adjacent to the expansion chamber, it is possible to achieve a muffler which is capable of securing sufficient length of the connection duct at a space with limited height, width and length. As a result, it is possible to achieve a muffler which can be mounted to a narrow space between a rotary engine cutter and an engine.

A plate member having two openings may be formed at an outer edge of the expansion chamber, and the openings may be formed at upper and lower parts of the plate member, respectively, and a first end of the connection duct may be connected to the exhaust port via the opening at the upper part of the plate member and a second end of the connection duct may be connected to the opening at the lower part of the plate member as an inlet of the expansion chamber.

Accordingly, since the expansion chamber can be fixed together with the connection of the connection duct and the exhaust port by forming a plate member, it is possible to increase attachment strength of the muffler without increasing the numbers of components.

The connection duct may include a branching portion, and a branch pipe having a closed end may be connected to the branching portion.

Accordingly, since the connection duct includes a branching portion and a branch pipe having a closed end is connected to the branching portion, an exhaust pressure pulsation effect can be reliably achieved.

Flanges may be provided to openings at both ends of the connection duct, and the flange at the first end of the connection duct may be fixed by inserting the plate member between the flange and the engine.

Accordingly, since the flanges are provided to openings at both ends of the connection duct and the flange at the first end of the connection duct is fixed by inserting the plate member between the flange and the engine, the connection duct and the expansion chamber can be fixed by common screws or bolts.

The connection duct may be formed by caulking, welding or brazing two members which are divided.

Accordingly, since the connection duct is formed by caulking, welding or brazing the two members which are divided, air-tightness can be improved and a pulsation effect can be reliably achieved.

The connection duct may be formed by welding or brazing a passage plate member to an outer wall of the expansion chamber.

Accordingly, since the connection duct is formed by welding or brazing a passage plate member to an outer wall of the expansion chamber, the muffler can be implemented with fewer components which can result in decrease in manufacturing costs of the muffler.

The branch pipe may have a U-shape, and the branch pipe and the connection duct may be arranged such that an axis of the connection duct and an axis of the branch pipe are substantially perpendicular to each other.

Accordingly, since the branch pipe and the connection duct are arranged such that an axis of the connection duct and an axis of the branch pipe are substantially perpendicular to each other, the connection duct and the branch pipe can be effectively arranged in a limited space.

The above and other objects and novel characteristics will be more apparent from the following detailed description and the drawings.

DESCRIPTION OF EMBODIMENT

Exemplary Embodiment 1

Figure 1:
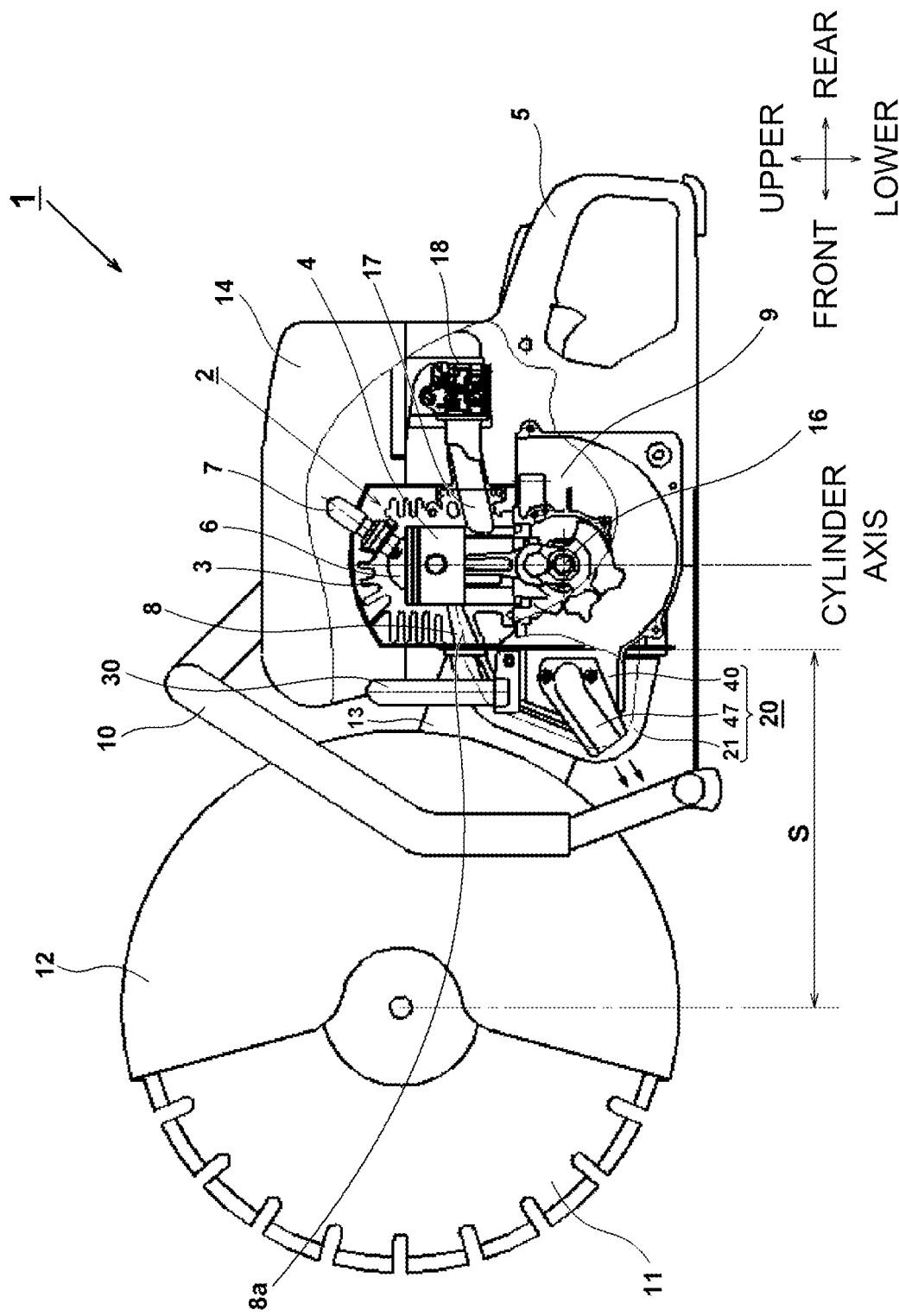
FIG. 1 is a lateral and partially cross-sectional view of an engine-driven working machine according to an exemplary embodiment of the present invention.

Hereinafter, exemplary embodiments of the present invention will be described with reference to the drawings. Throughout the drawings, the same elements are denoted by the same reference numerals, explanation of which will not be repeated. In the present specification, it is assumed that a front-rear direction and an upper-lower direction correspond to directions shown in FIG. 1.

FIG. 1 is a lateral and partially cross-sectional view of an engine-driven work machine 1 according to an exemplary embodiment of the present invention. The cross-section is at a position where an exhaust port 2 is divided into two parts in a cylinder axial direction of a two-cycle engine, and shows a state where a position of a piston is at a top dead center. In the present exemplary embodiment, the engine-driven work machine 1 is an engine cutter equipped with a two-cycle engine 2 inside an engine cover 14. A handle 10 to be gripped by an operator with his/her one hand (mostly a left hand) is provided in front of the engine cover 14, and a handle part 5 to be tightly gripped by the operator with the other hand (mostly a right hand) is provided near the rear end of the engine cover 14. In the engine 2, the piston 4 is placed to reciprocally move inside a cylinder 3 attached to the upper part of a crank case 9. The piston 4 is connected to a crank shaft 16 by a connecting rod. The cylinder 3 is fabricated by an integral molding of, for example, aluminum alloy. A plurality of heat diffusion fins are formed at the outer periphery of a head portion and a cylindrical portion which surrounds a combustion chamber 6 defined by the cylinder 3 and the piston 4.

An ignition plug 7 is attached to the upper part of the cylinder 3. An exhaust port (exhaust hole) 8, which is a part of the cylinder 3, is formed at a position where an opening of the exhaust port is opened/closed by the piston 4, and a muffler 20 is attached to the outside of the exhaust port 8. The muffler 20 is mainly constituted by a connection duct (main pipe) 21, an expansion chamber 40 and an exhaust outlet 47. Exhaust gas is obliquely discharged from the exhaust outlet 47 to the front-lower side, as indicated by an arrow. A scavenging port (not shown) is formed to the cylinder 3, and a passage from a crank case to the cylinder 3 is formed by a scavenging passage (not shown). An intake port 17 is also formed to the cylinder 3, and a carburetor 18 is attached to the intake port 17 via an intake pipe. An air cleaner (not shown) is connected to the carburetor 18.

A sequential cycle of the engine 2 will be described hereinafter. When fresh gas (mixed gas of fuel and air) is exploded by the ignition plug 7 as the piston 4 is ascended to the top dead center, the piston 4 is descended from the top dead center, and the exhaust port 8 communicates with the combustion chamber 6 so that combustion gas is discharged from the combustion chamber 6 to the outside of the engine 2. Since the internal pressure of the combustion chamber 6 is high immediately after the exhaust port 8 is opened, the combustion gas flows from the exhaust port to the connection duct 21 and a branch pipe 30 separately. At this time, a positive pressure wave emerges from the exhaust port 8, and most of the flown combustion gas passes through the connection duct 21. In addition, when the positive pressure wave passes a far end of the connection duct 21 communicating with the expansion chamber 40, a negative pressure wave propagates from the expansion chamber to the exhaust port 8, thereby introducing much fresh gas into the combustion chamber 6. Immediately before the exhaust port 8 is closed, the positive pressure wave returns from the expansion chamber 40 towards the exhaust port 8. Some of the positive pressure wave enters the branch pipe 30, and belatedly, the positive pressure wave returns to the exhaust port, thereby preventing the non-combusted fresh gas from being discharged from the combustion chamber 6. In the present exemplary embodiment, when length, volume and shape of the connection duct 21 and the branch pipe 30 are appropriately designed, the pressure of the exhaust port 8 may become negative by the negative pressure wave inverted at an open end of the connection duct immediately after the scavenging port is opened, thereby effectively introducing the fresh gas staying in the crank case 9 from the scavenging port into the combustion chamber 6, which may result in realizing high power.

When the scavenging port communicates with the combustion chamber 6, fresh gas is supplied from the crank case 9 into the combustion chamber 6. Then, the piston 4 reaches a bottom dead center, and subsequently, when the piston 4 ascends toward the top dead center, the scavenging port, the exhaust port 8 and the combustion chamber 6 becomes dis-communicated and the intake port 17 communicates with the inside of the crank case 9, thereby introducing the fresh gas into the crank case 9 through the intake port 17. The scavenging port is fully closed and, in the vicinity of a closed exhaust hole, some of the positive pressure wave propagated from the expansion chamber 40 increases a pressure in the vicinity of the exhaust port 8, and due to the return of the positive pressure wave introduced from the connection duct 21 to the branch pipe 30 belatedly, a high pressure is maintained in the vicinity of the exhaust port 8. Accordingly, in the vicinity of the closed exhaust hole, the fresh gas trying to escape from the exhaust port 8 can be returned to the combustion chamber 6, which may result in reduced exhaust gas and increased power.

In the engine-driven work machine 1 of the present exemplary embodiment, the engine 2 is a so-called upright engine in which the cylinder 3 is placed in a vertical (up-down) direction and the exhaust port 8 is placed to be opened from the engine 2 to the front. As used herein, the term "front" indicates that the exhaust port 8 is ahead of a plane passing a cylinder axis and the crank shaft 16, and also indicates a direction toward a rotation blade 11 which is a working member. Since the muffler 20 is directly attached to the vicinity of the exhaust port 8, the muffler 20 is located in a space between the engine 2 and the rotation blade 11. A wheel guard 12 is provided at the periphery of the rear side of the rotation blade 11. Since exhaust gas discharged from the exhaust output 47 in the arrow direction flows forward in a tangential direction of the wheel guard 12, the exhaust gas is unlikely to come into contact with an operator, and may act to flow out the dusts from the cutting machine toward the front side.

An arm 13 that supports a mechanism to rotate the rotation blade 11 is located at the right side of the muffler 20 of the engine-driven work machine 1. Although not shown in FIG. 1, an ignition coil that supplies a high voltage current to the ignition plug 7 is located at the left side of the muffler 20. Accordingly, the muffler 20 is located at a space whose left and right direction is limited and whose front-rear direction is limited by the rotation blade 11 and the engine 2. It is important to make the entire length of the engine-driven work machine 1 compact, and specifically, it is desirable to make a front-rear direction gap S between the cylinder axis of the engine 2 and the center of the rotation blade 11 as small as possible.

Figure 2:
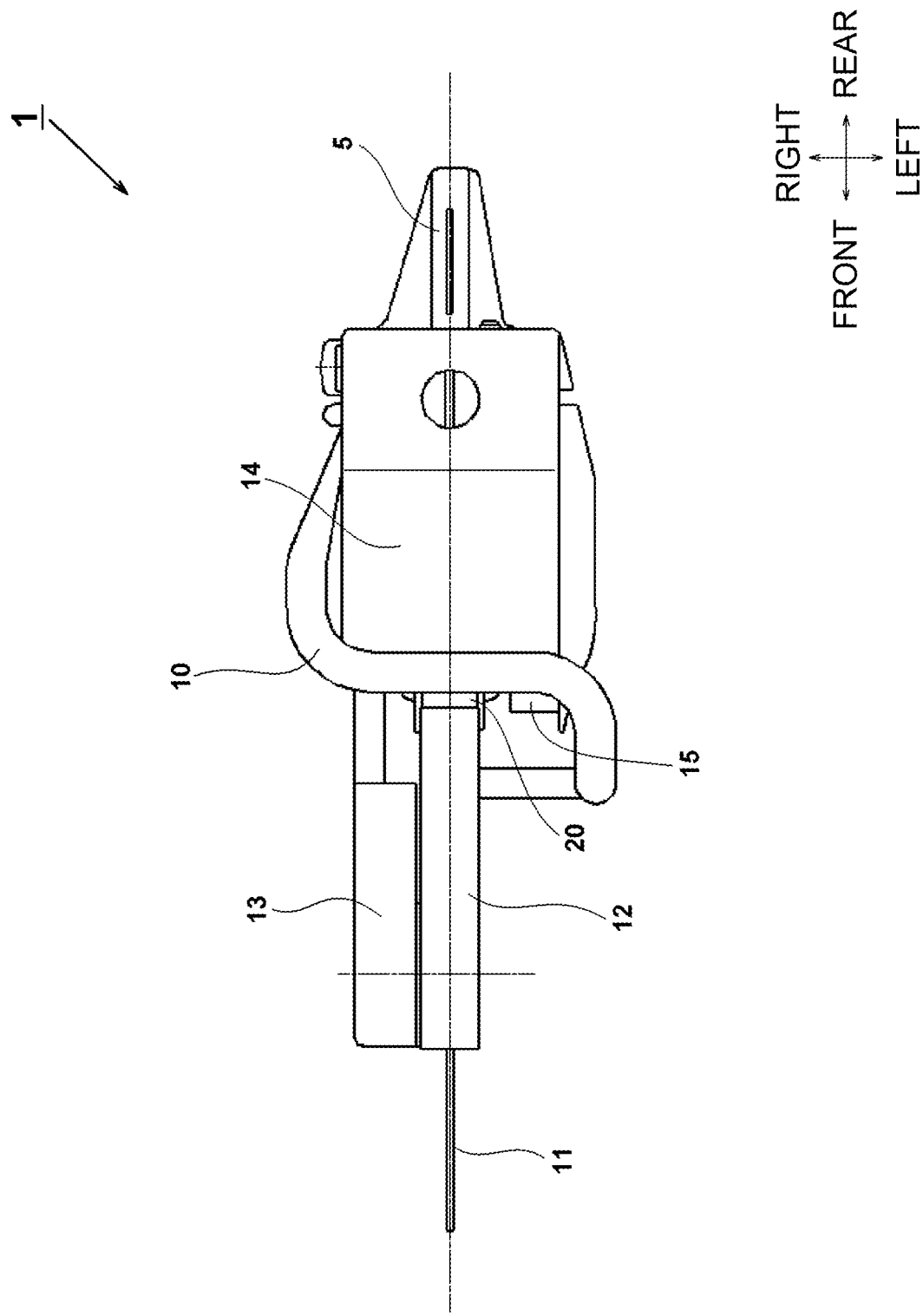
FIG. 2 is a plan view of the engine-driven work machine according to the exemplary embodiment of the present invention.

FIG. 2 is a plan view of the engine-driven work machine 1 according to the exemplary embodiment of the present invention. The muffler 20 is located at a space between the engine cover 14 and the wheel guard 12. An ignition coil holder 15 that holds the ignition coil is placed at the left side of the muffler 20. Since a position of the space where the muffler 20 is placed lies at the lower side of the handle 10 and provides a low possibility of contact of the muffler 20 with an operator, it is advantageous in view of heat insulation of the muffler 20. In addition, since the gap between the engine cover 14 and the wheel guard 12 is narrow at the upper side of the muffler 20, there is a lower possibility of contact of the operator with the muffler 20.

Figure 3:
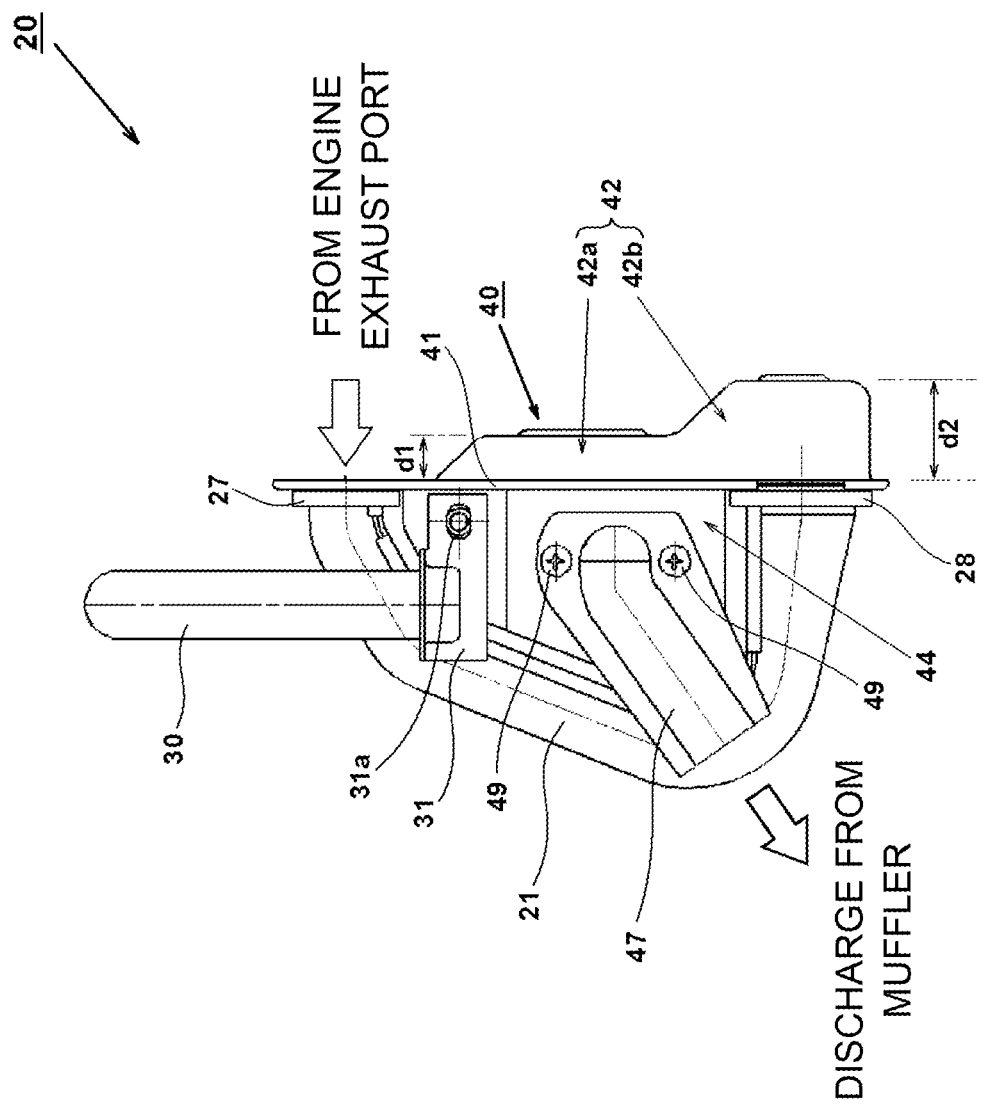
FIG. 3 is a lateral view of a muffler shown in FIG. 1.

FIG. 3 is a lateral view of the muffler 20 shown in FIG. 1. The muffler 20 is mainly constituted by the connection duct 21, the branch pipe 30, the expansion chamber 40 and the exhaust outlet 47. The exhaust gas discharged from the exhaust port 8 of the engine 2 flows into the connection duct 21 having a U-shape when viewed from the lateral side. The connection duct 21 connects the exhaust port 8 of the engine 2 and an inlet opening (which will be described later) of the expansion chamber 40. The connection duct 21 extends downward in such a manner that it is separated from the engine 2 and becomes distanced from an extension line of an axis 8a of the exhaust port 8. A flange 28 is provided at an inlet side (which will be described later) of the expansion chamber 40 in such a manner that the flange 28 faces an engine block such as the crank case 9. A flange 27 (first flange) is fixed to the cylinder 3 of the engine 2 by two bolts (not shown), and the flange 28 (second flange) is fixed to the expansion chamber 40 by two bolts (not shown).

The expansion chamber 40 provides a predetermined internal space for the purpose of reducing exhaust noise and is disposed at an inner side of the cylinder 3, the crank case 9 and the connection duct 21. That is, the expansion chamber 40 is disposed at a limited space defined by the cylinder 3, the crank case 9 and the connection duct 21. In the present exemplary embodiment, the expansion chamber 40 is formed as a single closed space having one opening (inlet) and one discharging hole (outlet). The opening as the inlet is placed with the flange 28 and the exhaust outlet 47 that guides exhaust gas to a particular direction is connected to the vicinity of the discharging hole as the outlet. The expansion chamber 40 has protuberant walls at the front and rear sides of a plate member 41 as a base, and a front side chamber 44 and a rear side chamber 42 are formed. As a result, a housing for defining the expansion chamber 40 is formed. Since the rear side chamber 42 has a shape following a shape of the crank case 9 of the engine 2, thickness (front-rear length) d2 of a lower part 42b thereof is larger than thickness (front-rear length) d1 of an upper part 42a thereof, thereby securing a volume of the expansion chamber as much as possible in a limited space.

Thus, as the expansion chamber can secure a sufficient length of the connection duct 21 in a space with limited height, width and length, the muffler 20 can be mounted in the space between the wheel guard 12 and the engine 2 even when the arm 13 that supports the wheel guard 12 or the mechanism to rotate the rotation blade 11 projects to the right side of the muffler 20, as in the engine-driven work machine 1 shown in FIGS. 1 and 2. The connection duct 21 is provided at the outside of the expansion chamber 40 to surround the expansion chamber 40, and is bent into an U-shape having an open end toward the crank case 9 when viewed from the lateral side as shown in FIG. 3. With such arrangement of the connection duct 21, the muffler 20 can become compact because the expansion chamber 40 is placed in the space defined by the cylinder 3, the crank case 9 and the connection duct 21.

As a gas guiding means that guides the discharged exhaust gas to a predetermined direction, the exhaust outlet 47 is connected to the vicinity of the discharging hole (which will be described later) of the expansion chamber 40, and is formed by pressing a metal plate. The exhaust outlet 47 is fixed to the expansion chamber 40 by two screws 49. Since the connection duct 21 is connected to extend along the axial direction of the exhaust port 8, passage resistance to the exhaust gas can be as small as possible, which may result in a sufficient exhaust pulsation effect. In addition, the branch pipe 30 having one end which is closed and another end which is opened is connected to the middle of the connection duct 21. Accordingly, a pressing member 31 as a fixing member that fixes the end of the branch pipe 30 is attached to the lateral side of the expansion chamber 40. Such arrangement of the branch pipe 30 is to synchronize a pressure wave at a normal rotational speed of 8,000 rpm to 9,000 rpm.

Figure 4:
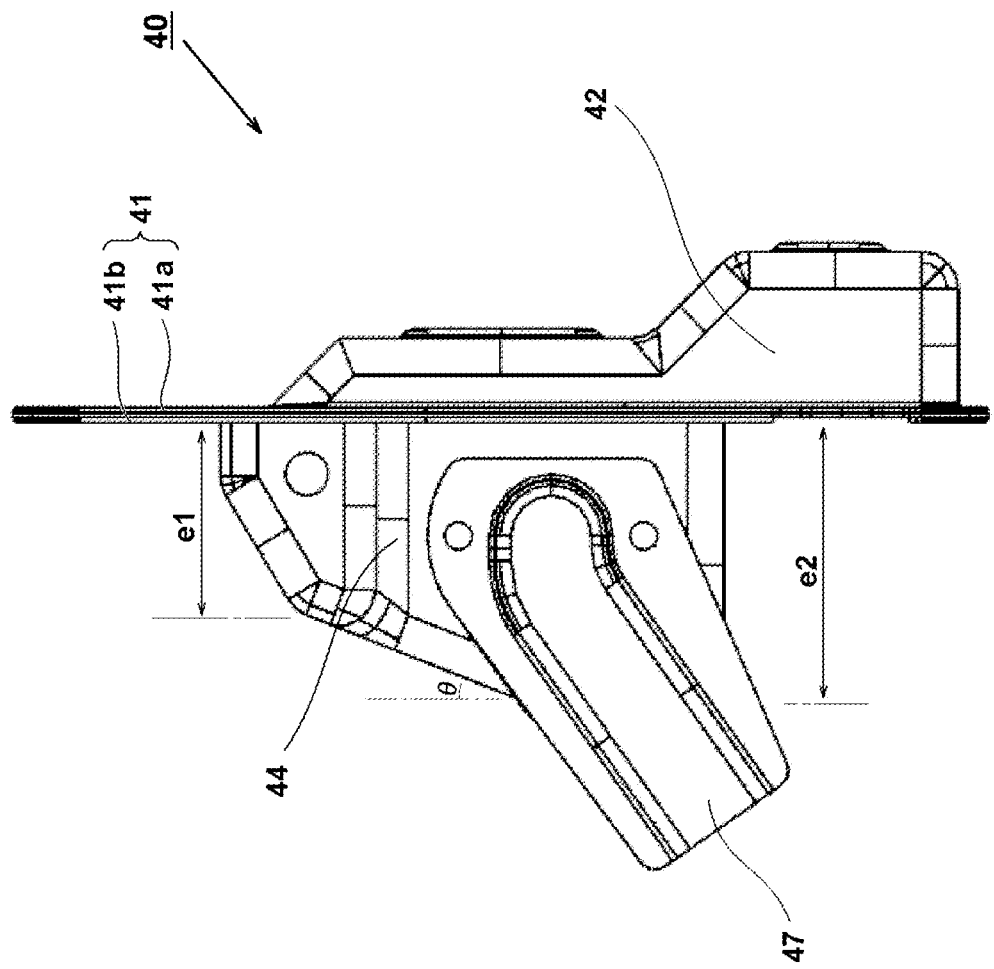
FIG. 4 is a lateral view of an expansion chamber of the muffler shown in FIG. 1.

FIG. 4 is a lateral view of the expansion chamber 40 of the muffler 20. Shapes of the front side chamber 44 and the rear side chamber 42 of the expansion chamber 40 is shown in FIG. 4. The closed space of the expansion chamber 40 is formed by forming the front side chamber 44 and the rear side chamber 42 by pressing two metal plates, respectively, and by fitting and bonding a front plate member 41b and a rear plate member 41a, which are residual in the outer periphery of these chambers 44 and 42. The front side chamber 44 has a shape following a shape of the inner circumference of the connection duct 21 and thickness (front-rear length) e1 at an upper part thereof is thinner than thickness (front-rear length) e2 at a lower part thereof, thereby securing a volume of the expansion chamber as much as possible in a limited space. A wall at the front of the front side chamber 44 is oblique by an angle θ as shown in FIG. 4. This is also a shape following the outer diameter of the rotation blade 11 which is a front end tool, and is suitable for disposing the muffler 20 in the rear of the rotation blade 11.

Figure 5:
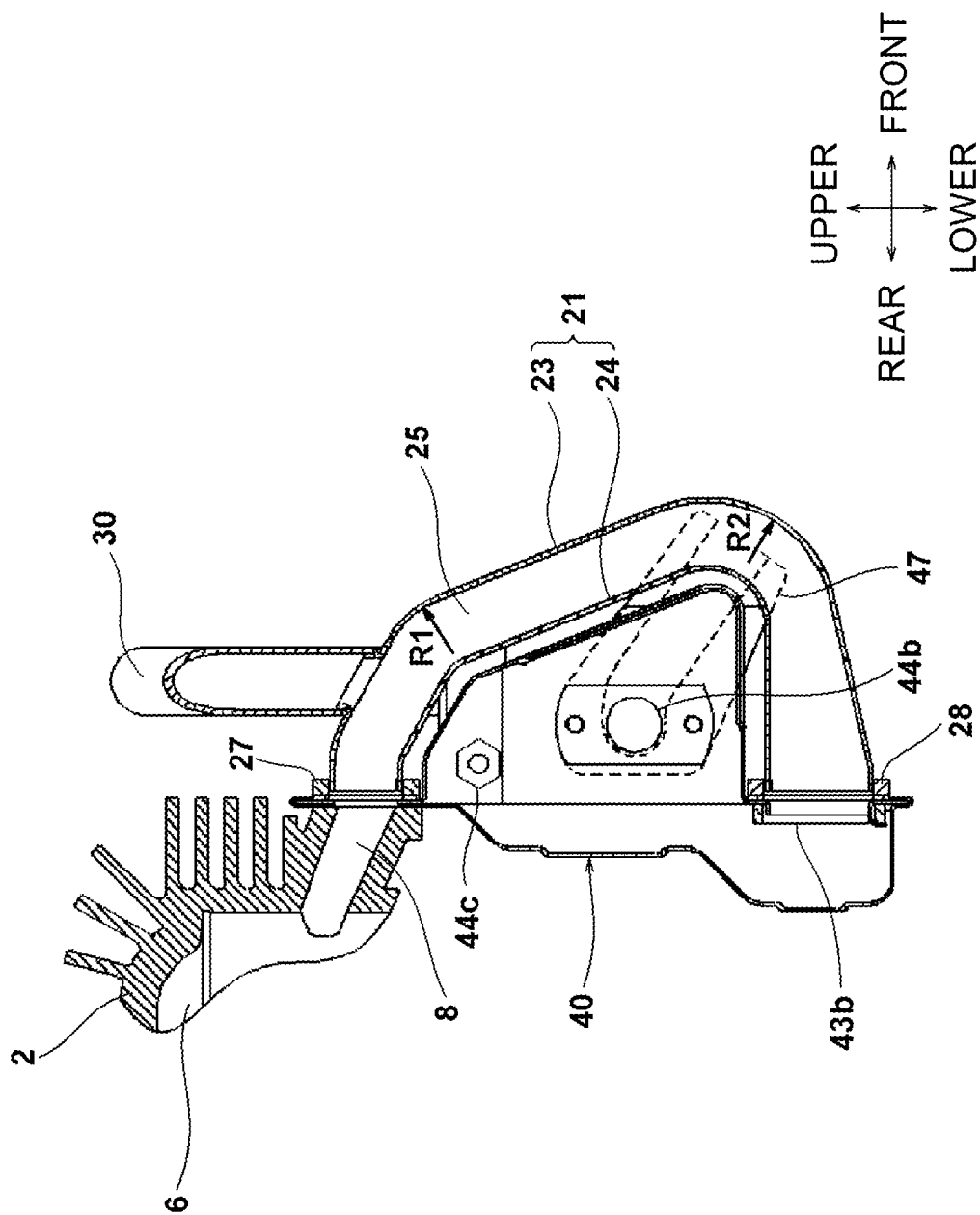
FIG. 5 is a cross-sectional view of the muffler shown in FIG. 1.

FIG. 5 is a cross-sectional view of the muffler 20. It should be noted that the front-rear direction in FIG. 5 is reverse to those in FIGS. 1 to 4 because FIG. 5 is a cross-sectional view viewed from the right side. The connection duct 21 extends along the periphery of the front side of the expansion chamber 40, and the flange 27 which can be attached to/detached from the cylinder 3 is provided in the end of the upper side of the duct. The flange 28 which can be attached to/detached from the expansion chamber 40 is provided in an end of the lower side of the connection duct. Herein, the flange 27 is fixed to the vicinity of the exhaust port 8 of the cylinder 3 by bolts (not shown). At this time, the flange 27 is fixed to insert the plate member 41 of the expansion chamber 40. The flange 28 is fixed to the rear side chamber 42 by bolts (not shown). Nuts (not shown) to be fixed to the bolts are welded or brazed to the inner circumferential wall of the rear side chamber 42. A nut 44c is fixed to the inner wall of the front side chamber 44 by welding or brazing. The nut 44c is to fix a bolt for fixing the pressing member 31 (see FIG. 3) that fixes one end of the branch pipe 30.

The connection duct 21 has an exhaust gas passage 25 defined by two members, i.e., a front wall 23 and a rear wall 24. The connection duct 21 has a shape following the outer diameter of the front side chamber 44 of the expansion chamber 40, and is mainly formed with two radiuses of curvature R1 and R2 (R1>R2). The radius of curvature R1 at a portion of the connection duct 21 closer to the exhaust port 8 is set to be as large as possible in order to prevent exhaust resistance from increasing, while the radius of curvature R2 at a portion of the connection duct 21 closer to the expansion chamber 40 is set to be as large as possible in order to make maximum use of a space between the wheel guard 12 and the engine 2, thereby securing a volume of the front side chamber 44 of the expansion chamber 40 as much as possible.

In the present exemplary embodiment, the interior of the expansion chamber 40 is a single large space having an opening 43b as an inlet of the expansion chamber 40 and an opening 44b as an outlet thereof. The interior of the expansion chamber 40 may not only be configured of a single room but also divided into two partitions, such as a first expansion chamber and a second expansion chamber, or into three or more partitions. A catalyst device may be placed in the interior of the expansion chamber 40.

Figure 6:
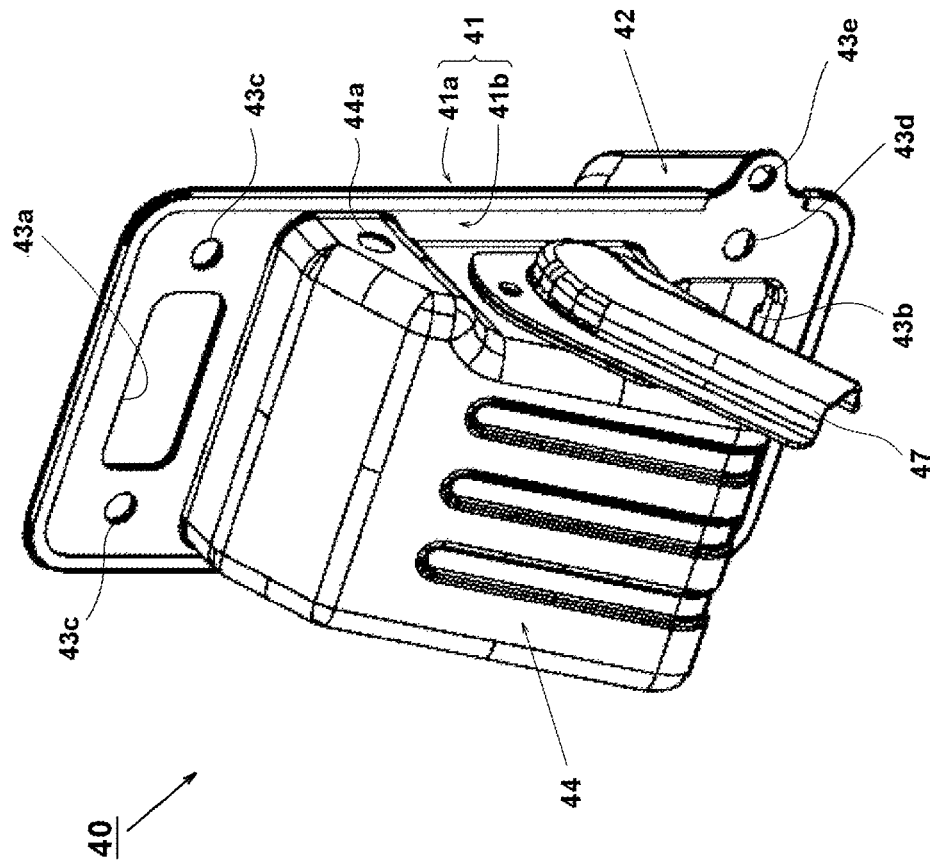
FIG. 6 is a perspective view of the expansion chamber of the muffler shown in FIG. 1.

FIG. 6 is a perspective view of the expansion chamber 40 of the muffler 20. The expansion chamber 40 is configured such that the plate member 41 projects toward outside of the periphery between the front side chamber 44 and the rear side chamber 42. The plate member 41 corresponds to a residual portion, which is not pressed in press machining of a rectangular metal plate to form the front side chamber 44 and the rear side chamber 42, and is used to bond the front side chamber 44 and the rear side chamber 42. Although the plate member 41 appears to be a single member in the perspective view of FIG. 6, the plate member 41 is formed with two metal plate members, i.e., the front plate member 41b integrated with the front side chamber 44 and the rear plate member 41a integrated with the rear side chamber 42. The rear plate member 41a is larger in size than the front plate member 41b, and is joined to the front plate member 41b by bending the periphery of the rear plate member 41a to fit into the periphery of the front plate member 41b.

An opening 43a for introducing exhaust gas from the exhaust port 8 of the engine 2 into the connection duct 21 is formed to the upper part of the plate member 41. In the present exemplary embodiment, the opening 43a has an approximately rectangular shape horizontally widened along the internal shape of the exhaust port 8 and the connection duct 21. However, the opening 43a is not limited thereto but may have a square shape or other shapes. Two screw holes 43c (first screw holes) through which bolts for fixing the flange 27 pass are formed in both left and right side of the opening 43a. Bolts (not shown) inserted from the flange 27 side pass through the two screw holes 43c and are joined to screw holes formed in the cylinder 3 of the engine 2.

An opening 43b for introducing exhaust gas discharged from the connection duct 21 into the expansion chamber 40 is formed in the lower part of the plate member 41. Two screw holes 43d (second screw holes) through which bolts for fixing the flange 28 pass are formed at both left and right sides of the opening 43b. Screw holes 43e (third screw holes) through which bolts for fixing the expansion chamber 40 to the crank case 9 pass are formed it both outer sides of the screw holes 43d. Unlike the flange 27, bolts (not shown) in the flange 28 are fixed to the expansion chamber 40. Nuts (not shown) are fixed in the back side of the screw holes 43d by welding or the like. Herein, the reason why the flange 28 and the plate member 41 are not directly fixed to the engine block such as the crank case 9 is to prevent the expansion chamber 40 from being loosened by vibration of the engine 2 to alleviate a possibility of leakage of the exhaust gas around the opening 43b. In addition, by fixing the expansion chamber 40 to the crank case 9 by bolts at a separate portion apart from the flange 28, drop-out by engine vibration can be more effectively prevented to provide more resistance to high power of the engine 2. In the present disclosure, screws and bolts are not differentiated from each other, and are almost synonymous with each other in terms of a joining member. As long as a joining means having a male portion and a female portion which are fixed to each other, any of screws, bolts and other means may be taken.

A screw hole 44a (fourth screw hole) for fixing the pressing member 31 is formed in the lateral side of the front side chamber 44. In the inner wall of the screw hole 44a, nut 44c (see FIG. 5) are fixed to the front side chamber 44 by welding or the like. The exhaust outlet 47 is also formed in the lateral side of the front side chamber 44. The exhaust outlet 47 covers the surroundings of the opening 44b (see FIG. 5), and guides the discharged exhaust gas in a predetermined direction.

Figure 7:
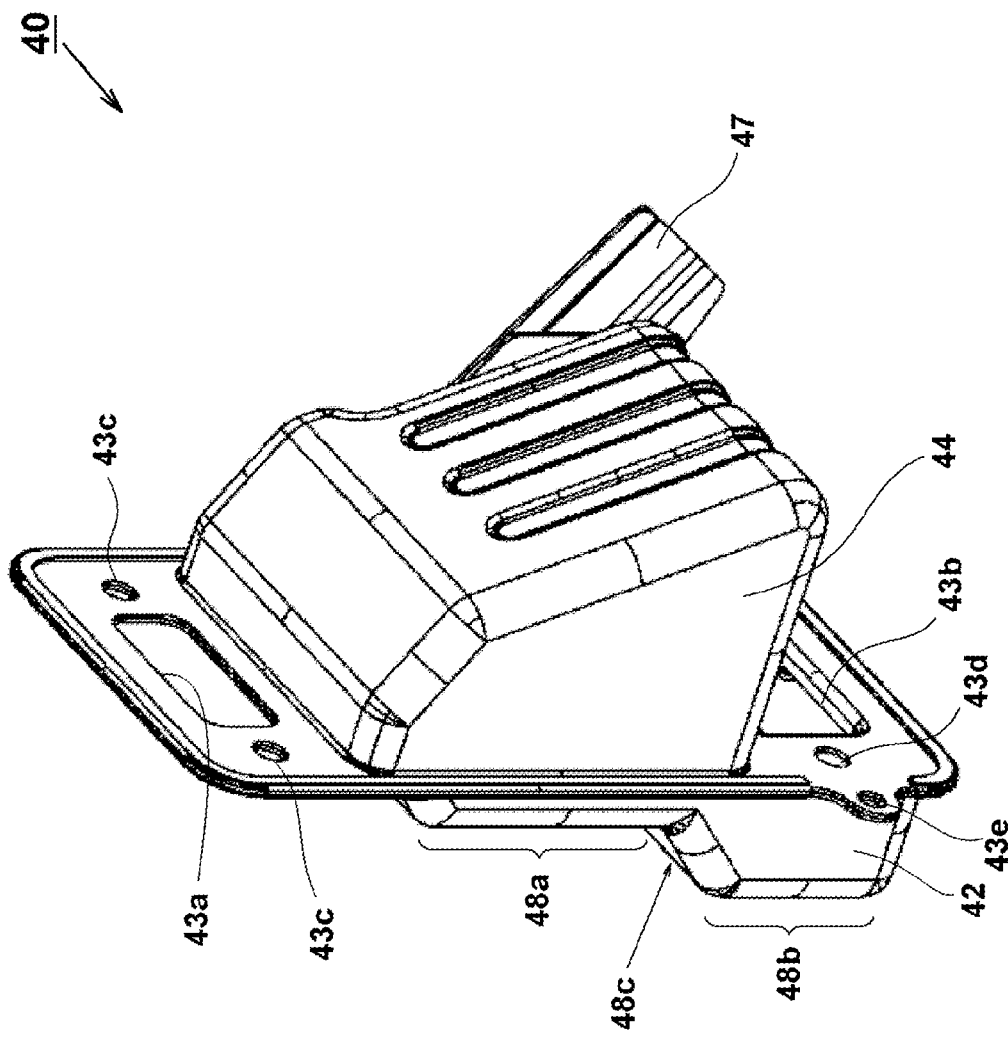
FIG. 7 is a perspective view of the expansion chamber of the muffler shown in FIG. 1 when viewed from a different angle.

FIG. 7 is a perspective view of the expansion chamber 40 of the muffler 20 when viewed from a different angle. Since a portion of the rear side chamber 42, denoted by reference numeral 48a, corresponds to a portion where the crank case 9 of the engine 2 is located, front-rear length (thickness) thereof is set to be relatively small. This is to prevent the expansion chamber 40 from excessively projecting to the front of the engine 2. Meanwhile, since a portion denoted by reference numeral 48b corresponds to a lower part of the crank case 9 to provide a relatively large space, front-rear length (thickness) thereof is set to be relatively large, thereby securing a volume of the expansion chamber 40. A portion indicated by an arrow 48c in the middle portion between the portion 48a and the portion 48b is formed to be oblique along the shape of the crank case 9.

Figure 8:
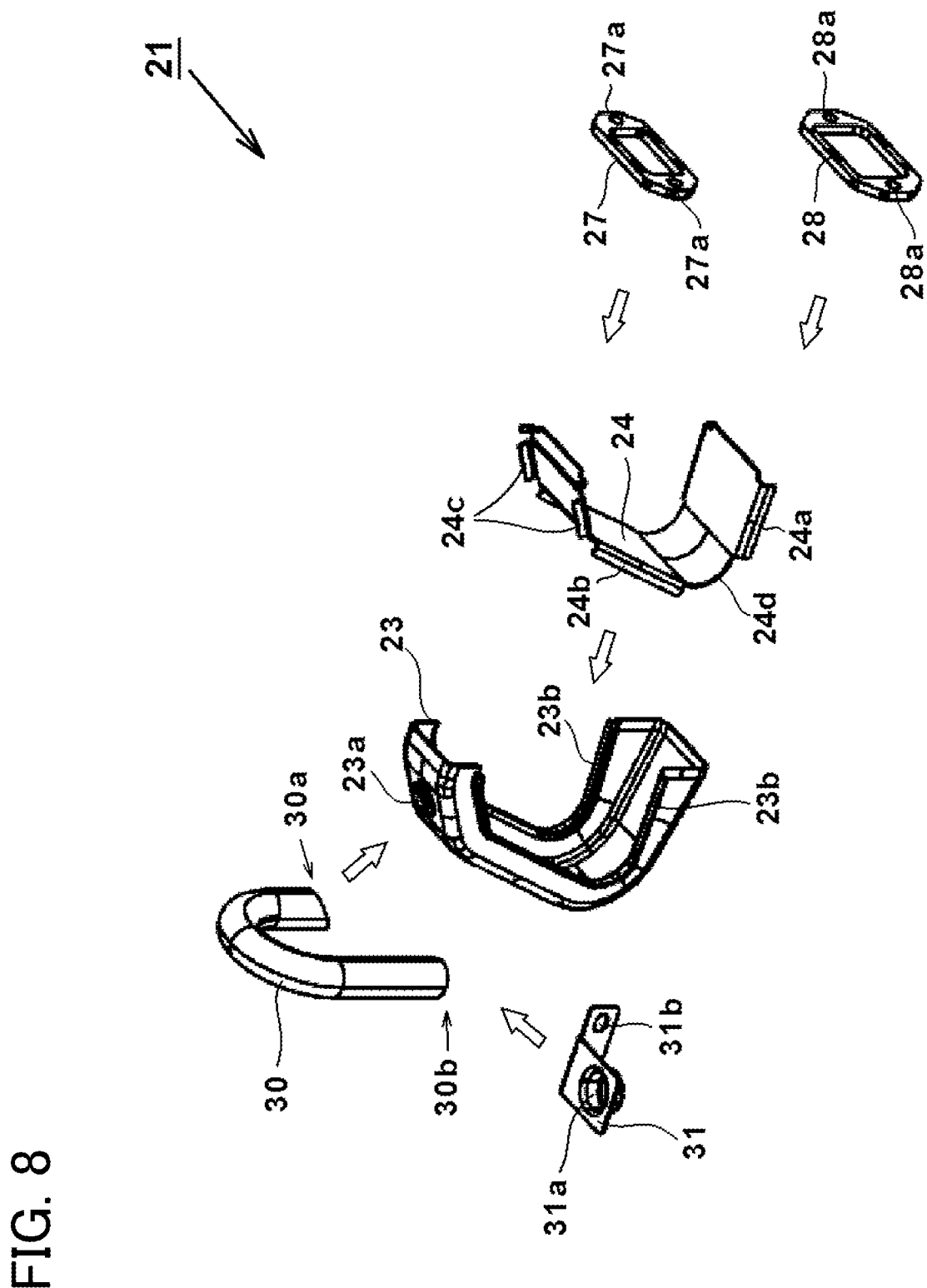
FIG. 8 is an exploded view illustrating an assembly structure of a connection duct and a branch pipe of the muffler shown in FIG. 1.

FIG. 8 is an exploded view illustrating an assembly structure of the connection duct 21 and the branch pipe 30. The connection duct 21 is constituted by two members, i.e., the front wall 23 and the rear wall 24. The front wall 23 and the rear wall 24 are formed by press machining a metal plate, respectively. The front wall 23 is pressed to have a U-shape when viewed from the lateral side such that ear portions 23b are formed in both peripheries of the inner circumference of the front wall 23. Meanwhile, the rear wall 24 is bent into a shape along the peripheries of the inner circumference of the front wall 23, thereby forming bent portions 24a, 24b and 24c for fixing the ear portions 23b therebetween. Forming the bent portions 24a to 24c to entire peripheries of the rear wall 24 is difficult. In particular, the bent portions 24a to 24c cannot be formed to a curved surface of the rear wall 24. Accordingly, the front wall 23 and the rear wall 24 are fixed to a curved surface 24d or the like where the bent portions 24a to 24c are not formed, by means of brazing or welding. After the front wall 23 and the rear wall 24 have been fixed, the flange 27 is joined to the upper opening and the flange 28 is joined to the lower opening. These flanges 27 and 28 may be fixed by welding, brazing, adhesion or the like. Such arrangement of the flanges 27 and 28 facilitates joining and fixing of the cylinder 3, the crank case 9 and the expansion chamber 40, which may result in prevention of the connection duct 21 from being damaged due to vibration of the engine 2.

A through hole 23a for connecting the U-shaped branch pipe 30 is formed in a portion of the front wall 23. The branch pipe 30 has one opened end 30a to be connected to the through hole 23a and the other closed end 30b. The through hole 23a is formed to have a tubular shape to extend to the interior of the opened end 30a and the branch pipe 30 is inserted in and fixed to the tubular through hole 23a. Meanwhile, since the connection duct 21 is always exposed to vibration during operation of the engine 2, the branch pipe 30 is preferably fixed to the front wall 23 by welding or brazing. The other end, i.e., the closed end 30b, of the branch pipe 30 is inserted in a cylindrical concave portion 31a of the pressing member 31, and the pressing member 31 is fixed to the lateral side of the front side chamber 44.

The reason for the divisional configuration of the connection duct 21 as shown in FIG. 8 is to form a passage of the connection duct 21 at a low cost, improve air-tightness of the passage and achieve a reliable pressure pulsation effect by joining two-divided plate members by caulking, welding or brazing. In addition, when the expansion chamber 40 is commonalized, the expansion chamber 40 can be applied to a number of tuning revolution of pulsation or different engine displacements only by changing length or sectional area of the connection duct 21 and the branch pipe 30, which may result in decrease in cost of the expansion chamber 40.

Exemplary Embodiment 2

Subsequently, a second exemplary embodiment of the present invention will be described with reference to FIG. 9. The second exemplary embodiment provides a connection duct 51 different from that of the first exemplary embodiment. The connection duct 51 is vertically divided into two parts, i.e., a left part 53 and a right part 54, in an axial direction of the exhaust port 8 and in a plane perpendicular to the crank shaft 16. The left part 53 and the right part 54 are joined to each other by caulking, welding or brazing. The present exemplary embodiment employs caulking for such joining. Accordingly, ear portions 54a and 54b are formed in the periphery in the vicinity of a joining portion of the right part 54 and bent portions 53a and 53b are formed in the periphery in the vicinity of a joining portion of the left part 53. The bent portions 53a and 53b are bent to insert the ear portions 54a and 54b therebetween, respectively. The left part 53 and the right part 54 may be formed at a low cost by press machining of a metal plate and may be joined by caulking.

Thereafter, when the left part 53 and the right part 54 are joined to each other, the flange 27 is joined to the upper opening and the flange 28 is joined to the lower opening. These flanges may be fixed by welding, brazing, adhesion or the like. Such arrangement of the flanges 27 and 28 facilitates joining and fixing of the cylinder 3 and the expansion chamber 40, which may result in prevention of the connection duct 51 from being damage due to vibration of the engine 2.

The semi-cylindrical ear portions 54a and 54b are formed in a portion which is in the vicinity of an upper portion of the left part 53 and the right part 54 and passes a joining plane of the left part 53 and the right part 54, and the opened end 30a of the branch pipe 30 is inserted in and fixed to a cylindrical portion defined by the semi-cylindrical ear portions. Meanwhile, since the connection duct 51 is always exposed to vibration during operation of the engine 2, the branch pipe 30 is preferably fixed to the cylindrical portion of the connection duct 51 by welding or brazing. The closed end 30b of the branch pipe 30 is inserted in the cylindrical concave portion 31a of the pressing member 31 and the pressing member 31 is fixed to the side of the front side chamber 44.

Exemplary Embodiment 3

Figure 10:
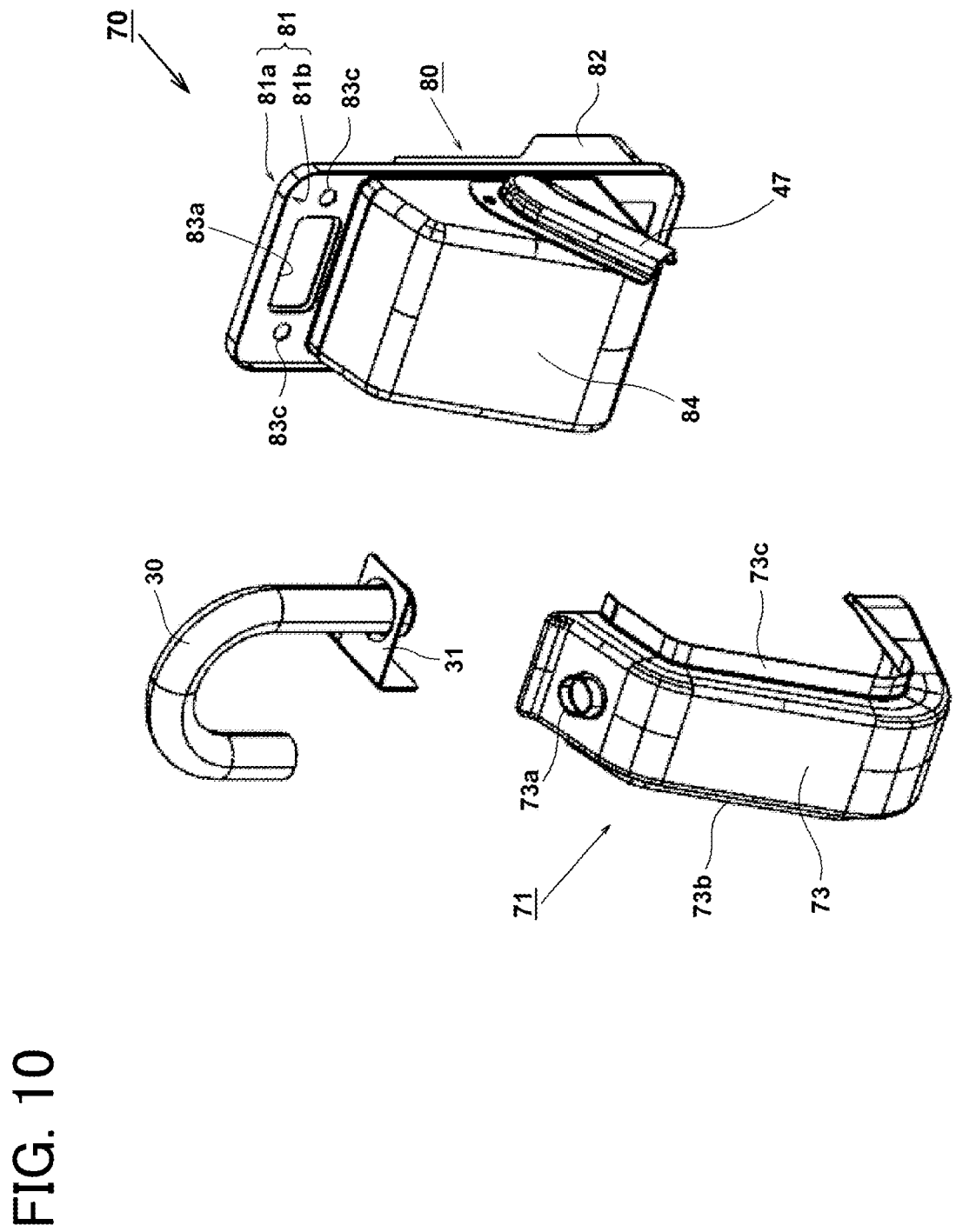
FIG. 10 is a perspective view of an expansion chamber of a muffler according to a third exemplary embodiment of the present invention.
Figure 11:
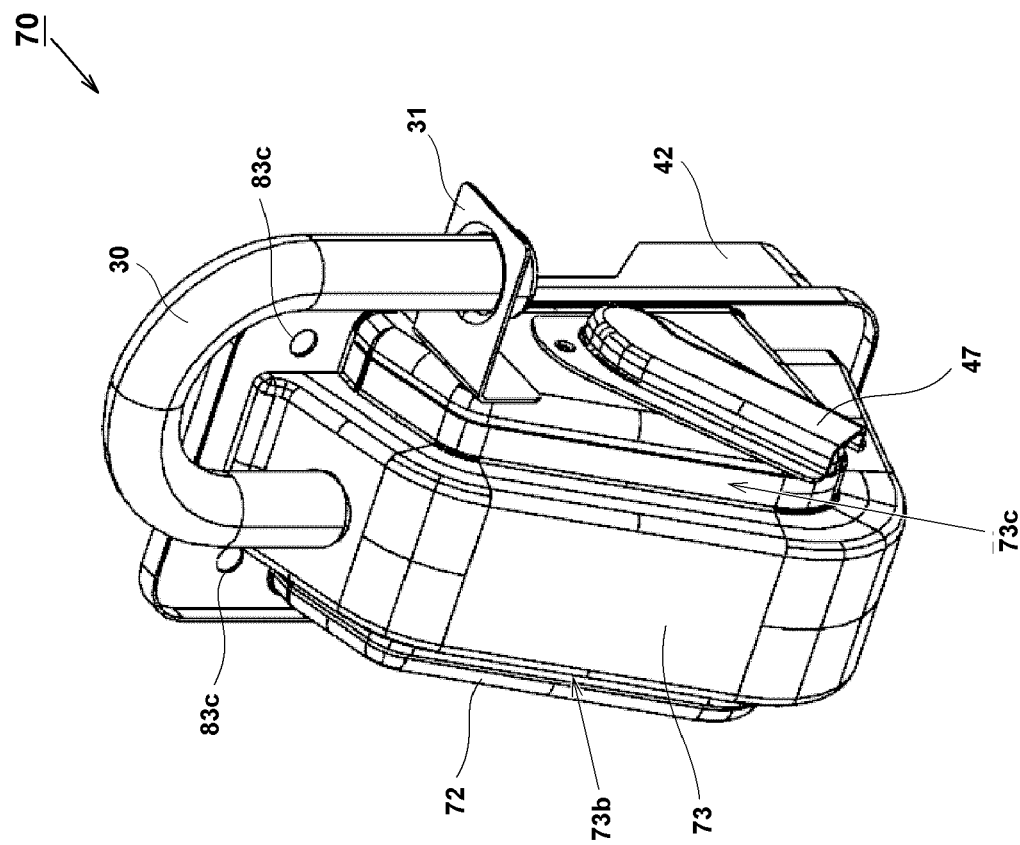
FIG. 11 is a perspective view of an assembled muffler according to the third exemplary embodiment of the present invention.

Subsequently, a third exemplary embodiment of the present invention will be described with reference to FIGS. 10 and 11. The third exemplary embodiment can fabricate a muffler at a lower cost than the first and second exemplary embodiments. A connection duct 71 is constituted by an outer wall of an expansion chamber 80 and a passage plate member 73. Accordingly, there is no need of a part corresponding to the rear wall 24 of FIG. 8. Ear portions 73b and 73c horizontally widened are formed to the periphery of the passage plate member 73 and are joined to the outer wall of a front side chamber 84 by welding or brazing. The passage plate member 73 is fabricated by pressing a metal plate and has substantially the same shape as the front side wall 23 of the first exemplary embodiment, which is U-shape when viewed from the lateral side.

The expansion chamber 80 has essentially substantially the same shape as the expansion chamber 40 of the first exemplary embodiment. However, since a portion of the outer wall of the front side chamber 84 forms the connection duct, an uneven portion, such as a rib for improvement of strength, is not formed to the outer wall of the front side chamber 84. A through hole 73a for connecting the branch pipe 30 is formed in a portion of the passage plate member 73. The U-shaped branch pipe 30 is connected to the through hole 73a. The branch pipe 30 has one opened end 30a to be connected to the through hole 73a and the other closed end 30b, as in the first exemplary embodiment. The through hole 73a is formed to have a tubular shape to extend to the interior of the opened end 30a, and the branch pipe 30 is inserted in and fixed to the tubular through hole 73a. The closed end 30b of the branch pipe 30 is inserted in a cylindrical concave portion 31a of the pressing member 31, and the pressing member 31 is fixed to the lateral side (a fixing part is not shown in FIG. 10) of the front side chamber 84.

Figure 9:
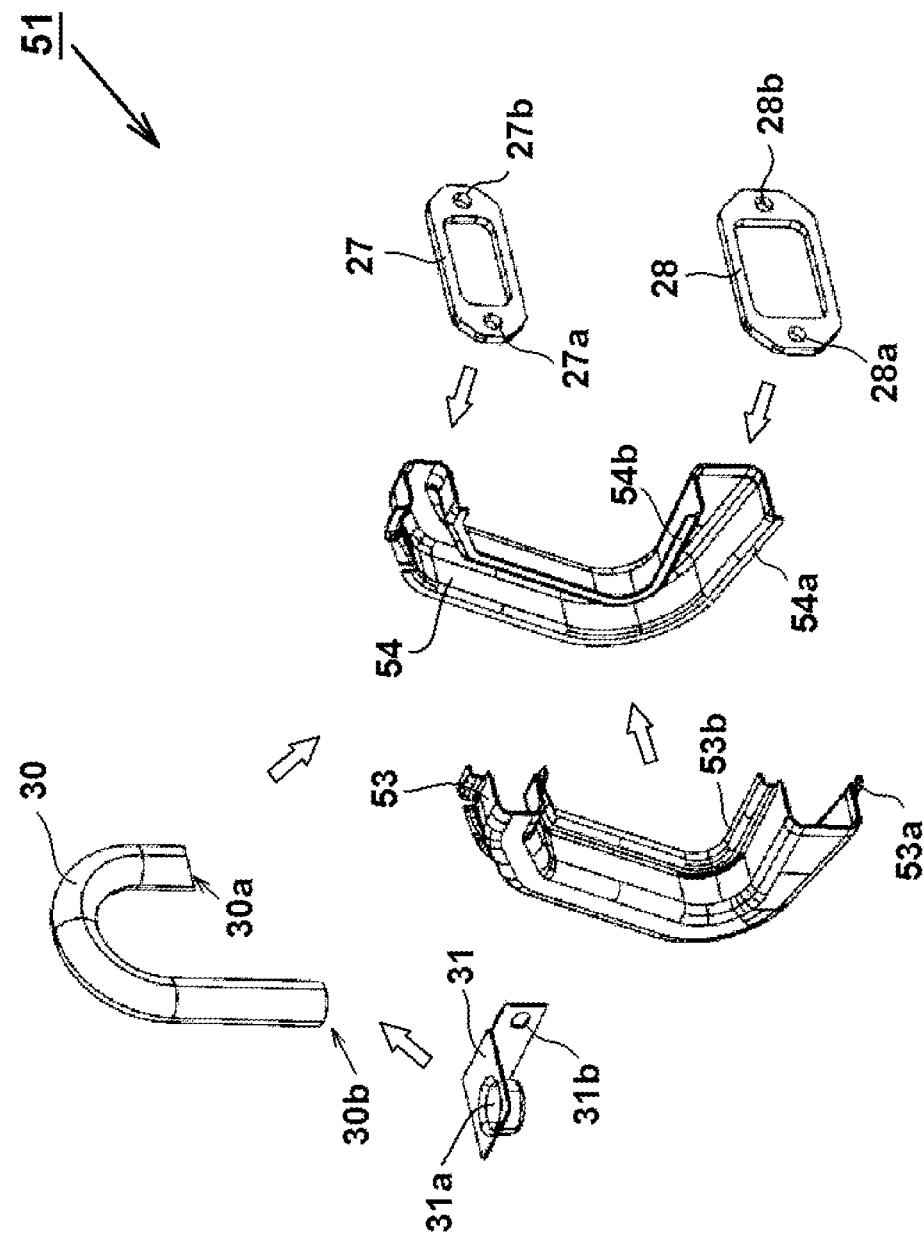
FIG. 9 is an exploded view illustrating an assembly structure of a connection duct and a branch pipe according to a second exemplary embodiment of the present invention.

In the third exemplary embodiment, since the passage plate member 73 and the expansion chamber 80 are directly fixed to each other by welding or brazing, the flanges 27 and 28 as shown in FIGS. 8 and 9 are not required. Accordingly, by passing bolts (not shown) through screw holes 83c of a plate member 81 and fixing the bolts to female screws formed in the cylinder 3, a muffler 70 is fixed to the cylinder 3 of the engine 2. Meanwhile, although the expansion chamber 80 shown in FIG. 10 has a structure so as not to be fixed to the crank case 9 of the engine 2 in the vicinity of a lower part thereof, the expansion chamber 80 may have a structure so as to be fixed by using the screw holes 43e as shown in FIG. 6.

In this manner, in the third exemplary embodiment, since the connection duct 71 is formed by fixing the passage plate member 73 to the expansion chamber 80, it is possible to achieve a muffler at a lower fabricating cost of the mold or material compared to forming the connection duct 21 or 51 by using two-divided press members.

As described above, according to the exemplary embodiments of the present invention, although a wheel guard and an arm that holds a power transmission to rotate a blade are formed around a muffler in, for example, an engine cutter that cuts a concrete and so on, thereby limiting height, width and length of an expansion chamber, since a volume of the expansion chamber can be sufficiently secured regardless of the limitation, and length of the connection duct connected to the exhaust port and the expansion chamber can be also sufficiently secured, decreased exhaust gas and high power by pressure pulsation can be obtained. In addition, it is possible to provide a compact muffler without destroying a pressure pulsation effect and an engine-driven work machine using the muffler.

Hitherto, the present invention has been described by way of the above exemplary embodiments which are not intended to have a limited sense but may be modified and practiced in various ways without departing from the spirit and scope of the present invention. For example, although in the above exemplary embodiments the engine-driven work machine has been illustrated with the engine cutter that cuts a concrete and so on, the present invention is not limited thereto but may be applied to other work machines including two-cycle and four-cycle engines as a source of power. In addition, the front end tool equipped in the engine-driven work machine is not limited to the rotation blade but may use other known tools and working members.

This application claims priority from Japanese Patent Application No. 2011-067535 filed on Mar. 25, 2011, the entire contents of which are incorporated herein by reference.

INDUSTRIAL APPLICABILITY

According to an aspect of the invention, there is provided a compact muffler, in which a pressure pulsation effect is not destroyed, and an engine-driven work machine including the muffler.

What is claimed is:

1. An engine-driven work machine comprising:
an engine including
a piston which is configured to reciprocally move inside a cylinder to which an exhaust port is formed, and
an engine block including the cylinder and a crank case; and
a front end tool configured to be driven by the engine,
wherein an expansion chamber is connected to the exhaust port via a connection duct,
wherein the connection duct includes a first end at a side of the cylinder to which the exhaust port is formed and a second end, and the connection duct extends from the first end in an axial direction of the exhaust port, is bent in a direction away from an axis of the exhaust port, extends in an axial direction of the cylinder and is connected to the expansion chamber at the second end, and
wherein the expansion chamber is disposed between the crank case and an inner side of the connection duct which is bent in the direction away from the axis of the exhaust port.

2. The engine-driven work machine according to claim 1, wherein the connection duct has a U-shape in which the second end connected to the expansion chamber faces the crank case of the engine.

3. The engine-driven work machine according to claim 1, wherein the connection duct includes a branching portion, and
wherein a U-shaped branch pipe having a closed end is connected to the branching portion.

4. The engine-driven work machine according to claim 1, wherein a first flange and a second flange are fixed to both ends of the connection duct, respectively, and the first flange is joined to the exhaust port and the second flange is joined to the expansion chamber.

5. The engine-driven work machine according to claim 2, wherein the expansion chamber has a wall having a shape following an inner circumference side shape of the connection duct, and
wherein a radius of curvature R1 of an upper side of the connection duct is larger than a radius of curvature R2 of a lower side of the connection duct.

6. The engine-driven work machine according to claim 4, wherein a plate member extending outward is formed at an outer edge of the expansion chamber, and
wherein the expansion chamber is fixed to the engine by inserting the plate member between the cylinder and the first flange.

7. The engine-driven work machine according to claim 6, wherein the plate member includes a second screw part which is for fixing the plate member to the second flange and a third screw hole which is for fixing the plate member to the engine and which is formed in the vicinity of the second screw part.

8. The engine-driven work machine according to claim 1, wherein the connection duct is configured by two members separated at a cross-section surface parallel to a longitudinal direction thereof, each member being formed by joining a metal press member.

9. The engine-driven work machine according to claim 1, wherein an exhaust hole is formed at a lateral side of the expansion chamber and an exhaust outlet that discharges the exhaust gas to the front-lower side of the engine is formed to the exhaust hole.

10. A muffler comprising:
an expansion chamber fixed to a cylinder and a crank case of an engine; and
a connection duct connecting an exhaust port of the engine to an opening of the expansion chamber and has a bent shape when viewed from the lateral side,
wherein the expansion chamber is disposed between an inner side of the bent connection duct and the crank case and has a shape following a shape of the crank case and the connection duct adjacent to the expansion chamber.

11. The muffler according to claim 10,
wherein a plate member having two openings is formed at an outer edge of the expansion chamber, and
wherein the openings are formed at upper and lower parts of the plate member, respectively, and a first end of the connection duct is connected to the exhaust port via the opening at the upper part of the plate member and a second end of the connection duct is connected to the opening at the lower part of the plate member as an inlet of the expansion chamber.

12. The muffler according to claim 10, wherein the connection duct includes a branching portion, and
wherein a branch pipe having a closed end is connected to the branching portion.

13. The muffler according to claim 10, wherein flanges are provided to openings at both ends of the connection duct, and
wherein the flange at the first end of the connection duct is fixed by inserting the plate member between the flange and the engine.

14. The muffler according to claim 10, wherein the connection duct is formed by caulking, welding or brazing two members which are divided.

15. The muffler according to claim 10, wherein the connection duct is formed by welding or brazing a passage plate member to an outer wall of the expansion chamber.

16. The muffler according to claim 12, wherein the branch pipe has a U-shape, and
  wherein the branch pipe and the connection duct are arranged such that an axis of the connection duct and an axis of the branch pipe are substantially perpendicular to each other.

17. The engine-driven work machine according to claim 1, wherein the connection duct is bent in the direction away from the axis of the exhaust port in a plane including the axis of the exhaust port and a cylinder axis.

18. The engine-driven work machine according to claim 1, wherein the expansion chamber is fixed to the cylinder at the first end side of the connection duct, and the expansion chamber is fixed to the crank case at the second end side of the connection duct.

19. The engine-driven work machine according to claim 1, wherein a portion of the expansion chamber, which is adjacent to a portion thereof connected to the connection duct, follows a shape of the crank case and protrudes toward a cylinder axis side.

* * * * *